(12) United States Patent
Vesikivi et al.

(10) Patent No.: US 7,474,196 B2
(45) Date of Patent: Jan. 6, 2009

(54) APPARATUS, SYSTEM, METHOD AND COMPUTER PROGRAM PRODUCT FOR IMPLEMENTING AN AUTOMATIC IDENTIFICATION SYSTEM WITH A PERSONAL COMMUNICATION SYSTEM TO IMPROVE FUNCTIONALITY

(75) Inventors: Petri Vesikivi, Espoo (FI); Peter Anthony Wakim, Helsinki (FI); Sami Ranta, Helsinki (FI)

(73) Assignee: Nokia Corporation, Espoo (FI)

( * ) Notice: Subject to any disclaimer, the term of this patent is extended or adjusted under 35 U.S.C. 154(b) by 508 days.

(21) Appl. No.: 11/211,702

(22) Filed: Aug. 26, 2005

(65) Prior Publication Data

US 2006/0043201 A1 Mar. 2, 2006

Related U.S. Application Data

(62) Division of application No. 10/368,486, filed on Feb. 20, 2003, now Pat. No. 6,978,118.

(51) Int. Cl.
*H04Q 7/00* (2006.01)

(52) U.S. Cl. .............. 340/10.1; 340/10.3; 340/572.1; 340/539.11; 235/375; 235/380; 235/386; 235/492; 345/169; 345/172; 455/41.1; 455/41.2; 455/41.3

(58) Field of Classification Search .......... 340/10.1, 340/10.3, 10.4, 10.5, 572.1, 572.4; 455/41.1, 455/41.2; 345/169, 172; 434/322, 335, 336; 235/375, 380, 382, 385, 492
See application file for complete search history.

(56) References Cited

U.S. PATENT DOCUMENTS

| | | | | |
|---|---|---|---|---|
| 3,427,732 A | * | 2/1969 | Wopart, Jr. ................ 434/336 |
| 5,764,221 A | * | 6/1998 | Willard ...................... 345/173 |
| 6,176,425 B1 | * | 1/2001 | Harrison et al. ............. 235/385 |
| 6,257,486 B1 | * | 7/2001 | Teicher et al. ............... 235/380 |
| 6,380,928 B1 | * | 4/2002 | Todd .......................... 345/169 |
| 6,400,272 B1 | | 6/2002 | Holtzman et al. |
| 6,611,673 B1 | | 8/2003 | Bayley et al. |
| 6,687,609 B2 | | 2/2004 | Hsiao et al. |
| 6,726,109 B2 | * | 4/2004 | Yamagishi et al. .......... 235/492 |
| 6,978,118 B2 | * | 12/2005 | Vesikivi et al. ............. 455/41.1 |
| 7,171,192 B2 | * | 1/2007 | Song et al. ................ 455/414.3 |
| 7,290,715 B2 | * | 11/2007 | Sellen et al. ................ 235/492 |
| 2002/0008690 A1 | * | 1/2002 | Cooper ....................... 345/156 |
| 2003/0136851 A1 | * | 7/2003 | Habara et al. ............... 235/492 |
| 2004/0074958 A1 | * | 4/2004 | Foth et al. ................... 235/375 |

(Continued)

OTHER PUBLICATIONS

PCT International Search Report dated May 26, 2005.

*Primary Examiner*—Jeffery Hofsass
*Assistant Examiner*—Anne V Lai
(74) *Attorney, Agent, or Firm*—Morgan & Finnegan LLP

(57) ABSTRACT

An apparatus, system, method and computer program product for implementing an automatic identification system to improve the functionality of a personal communication device. A data carrier that contains one or more data items transmits a data signal wirelessly to a personal communication device equipped with an RFID reader. The personal communication device decodes the data signal and at least a portion of the data is used by the personal communication device to establish a communication connection with another device or network. The data subsequently transmitted by the personal communication device is accomplished using GSM, GPRS, WAP, EDGE, UMTS or other similar wireless network protocol. The communication connection is used to provide a request for a service such as a phone call, an Internet connection, a third party service, or to request for the storage of data in a network.

17 Claims, 9 Drawing Sheets

U.S. PATENT DOCUMENTS

2004/0122685 A1 6/2004 Bunce
2004/0166879 A1 8/2004 Meadows et al.
2004/0203352 A1 10/2004 Hall et al.
2004/0260646 A1 12/2004 Berardi et al.

* cited by examiner

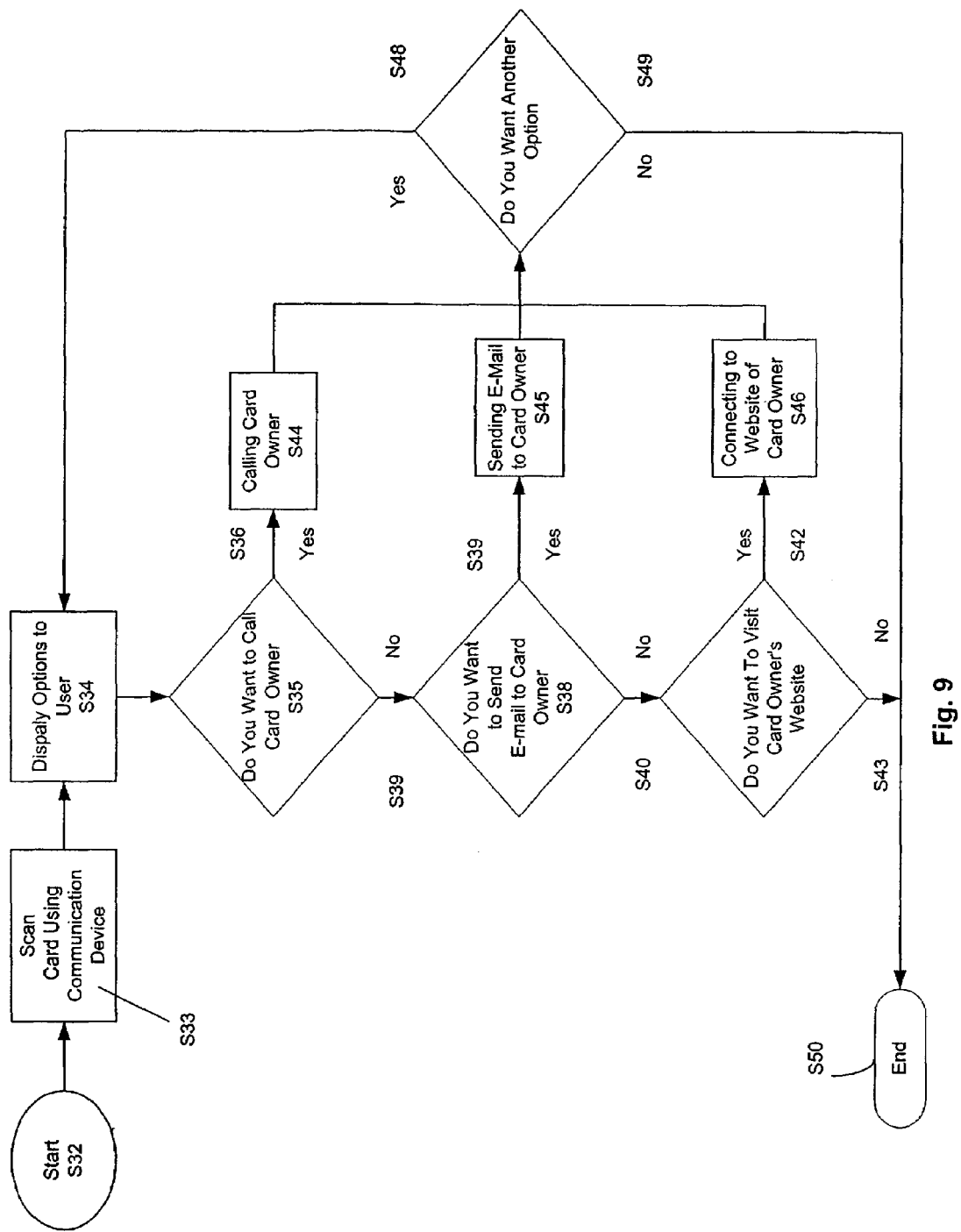

APPARATUS, SYSTEM, METHOD AND COMPUTER PROGRAM PRODUCT FOR IMPLEMENTING AN AUTOMATIC IDENTIFICATION SYSTEM WITH A PERSONAL COMMUNICATION SYSTEM TO IMPROVE FUNCTIONALITY

This is a divisional application of prior application Ser. No. 10/368,486, filed on Feb. 20, 2003 now U.S. Pat. No. 6,978,118, which is hereby incorporated by reference.

FIELD OF THE INVENTION

The apparatus, system, method and computer program product of the present invention is directed to the use of a data carrier having a plurality of data fields containing one or more data items. The data carrier uses RFID transponders associated with data items to wirelessly transmit a data signal to a personal communication device having access to an RFID reader.

BACKGROUND OF THE INVENTION

In past years automatic identification systems have been popular in many service industries, purchasing and distribution logistics, manufacturing and material flow systems. Automatic identification procedures have been used to provide information or data about people, animals, goods, and products in transit.

One example of an automatic identification system is a barcode system. Barcode is a binary code comprising a field of bars and gaps arranged in a parallel configuration. The code is arranged according to a predetermined pattern and represents data elements that refer to an associated symbol. The sequence of code is made up of wide and narrow bars and gaps that can be interpreted numerically and alphanumerically. The code is read using an optical laser scanning technique that reads the sequence of code based on the reflection of a laser beams from the black bars and white gaps of the code. The most popular barcode by some margin is the EAN code (European Article Number), which was designed specifically to fulfill the requirements of the grocery industry in 1976. Barcodes are extremely cheap, but have low storage capacity and cannot be reprogrammed.

Another example of an automatic identification system is optical character recognition (OCR). OCR was first used in the 1960's as a special font developed for stylized characters that can be read both in the normal way by people and automatically by machines. The advantage of OCR systems is the high density of information and the possibility of reading data visually in an emergency. However, OCR systems have failed to become universally applicable because of their high price and the need for complicated character readers.

In today's technologically advanced society it would advantageous for automatic identification systems to be compatible with systems from varied fields of technology such as telecommunications. Considering that wireless communication devices are now used in almost every aspect of every day life in the form of PDAs, satellite phones, smart cellular phones, handheld computers, wireless-enabled laptops and Bluetooth devices, it would be useful to be able to utilized data from automatic identification systems to further improve the functionality of today's wireless devices. However, the automatic identification systems noted above may not be suitable candidates for integration with today's wireless devices given their obvious drawbacks.

One possible solution is the use of contactless ID systems called RFID (Radio Frequency Identification) systems. The typical RFID system includes an RFID reader, an RFID transponder and some kind of data processing system to process the data read from the RFID transponder. RFID readers wirelessly communicate with the RIFD transponders through the use of radio frequency (RF) signals. The readers send out an RF signal that "wakes up" the RFID transponder. The transponder then transmits a data signal back to the interrogator via an RF frequency signal. In RFID systems there is no need for physical contact between the RFID transponder and the RFID reader to transfer data. The size of the RFID transponder can be made at present very small and the prices have also gone down thus allowing their widespread use. A more detailed discussion of RFID wireless network principles are described in a publication entitled "Radio Frequency Identification: A Basic Primer," published by the Automatic Identification Manufacturers (AIM) web site (http://www.aimglobal.org), Oct. 23, 2001 and fully incorporated herein by reference.

As mentioned previously, RFID systems are already used in many sectors of industry, commerce and services where data needs to be collected. The attributes of RFID systems are complementary to other data capture technologies and thus able to satisfy particular application requirements that cannot be adequately accommodated by alternate technologies. At present, the principal areas of application for RFID systems include:

transportation and logistics;
manufacturing and processing;
animal tagging;
waste management;
time and attendance;
postal tracking;
airline baggage reconciliation; and
road toll management.

However, none of the applications of RFID systems noted above include implementation with wireless, personal communication devices. Thus, it is desirable to provide an apparatus, system method and computer program product for implementing RFID data communication with a wireless, personal communication device to improve device functionality. The apparatus, system, method and computer program product of the present invention disclosed herein address this need.

SUMMARY OF THE INVENTION

To overcome limitations in the prior art described above, and to overcome other limitations that will be apparent upon reading and understanding the present application, the present invention is directed to an apparatus, method, system and computer program product for implementing RIFD data communication with a personal communication device.

More specifically, the present invention utilizes a data carrier having data fields containing one or more data items and corresponding RFID transponders. The RFID transponder includes data that is at least partly retrievable by a user for later application. The data fields include machine-readable data such as barcode or OCR data; textual data; and graphical data such as drawings, symbols or photos. Additionally, at least one RFID transponder may contain data for the identification of the data carrier itself.

The RFID transponders are passive or active and capable of transmitting data signals to the RFID reader in the personal communication device or to RFID reader being connected to the personal communication device. The RFID transponders on the data carrier will transmit data signals wirelessly to the RFID reader in the personal communication device where the RFID reader decodes the data signals. After decoding, the central processor of the personal communication device uses at least a portion of the data received from the data carrier to execute a communication connection with another device or data network. The data transmitted from the personal communication device via the communication connection is transmitted wireless using GSM, GPRS, WAP, EDGE, UMTS or other similar wireless network protocol. The communication connection can be used to provide a request for service such as a phone call, an Internet connection, third party service, or to request data storage in a separate computer network.

In an embodiment contemplated by the invention, the data carrier is a business card with at least one data field containing name data, address data, phone number data and business data and having one or more RFID transponders. In this embodiment, the data content of at least one RFID transponder is associated with the data content of at least one of the data fields. In application, the user of a personal communication device receives an RFID business card containing third party data that may or may not be of interest to the user. The user scans the business card using the RFID reader in the personal communication device. The data is decoded and processed by the personal communication device. The personal communication device then uses the data to display options to the user related to the third party data received by the data carrier. For example, the options as viewed by the user may include, "would you like to call the third party?"; "would you like to connect to the third party website?"; or "would you like to send an e-mail to the third party?" Once the user make a selection, the personal communication device will establish a communication connection to another device using at least part of the data received from the data carrier. At least a portion of the data transmitted by the data carrier is related to the owner of the RFID business card. Additionally, the RFID reader in the personal communication device may include software to establish communication with other device applications such as SMS, WAP browser, address book, phone book, e-mail, calender and map applications.

In another embodiment contemplated by the invention, the data carrier is a questionnaire with a plurality of data fields containing at least one question having corresponding selectable answers, and a plurality of RFID transponders associated with each selectable answer. In this embodiment, a user receives and RFID questionnaire along with a personal communication device containing an RFID reader. The user reads the questions presented on the questionnaire and selects an answer by touching a corresponding answer button. At least one RFID transponder is provided for each answer button. Once all the question are answered, the user can transmit the response to the questionnaire (or the RFID data associated with the selected answers) to the personal communication device by pressing a "submit or send" button on the questionnaire. The personal communication device reads the data sent by the RFID transponders of the questionnaire, and uses at least a portion of the data received to execute a communication connection for transmitting the questionnaire data to another device or data network. In one embodiment of the invention the response is sent as one or more SMS messages.

In yet another embodiment contemplated by the invention, the questionnaire has a plurality of data fields containing at least one proposal having a corresponding selectable opinion, and a plurality of RFID transponders associated with each of the selectable opinions. The data carrier includes RFID transponders with at least a portion of data for setting up a communication connection for transmitting the responses to the questionnaire to another device or data network.

It is contemplated by the invention that the RFID transponders and the personal communication device are wireless devices.

It is contemplated by the invention that the personal communication device uses a wireless protocol such as GSM, GPRS, WAP, EDGE, UMTS or other similar wireless protocol for transmitting data. In one embodiment of the invention the data is sent as one or more SMS messages.

It is contemplated by the invention that the personal communication device is a cellular telephone, a satellite telephone, a personal digital assistant or a Bluetooth device.

It is contemplated by the present invention that the transponders transmit at least one data item for providing a predefined function to be performed by the personal communication device.

BRIEF DESCRIPTION OF THE DRAWINGS

The accompanying figures best illustrate the details of the apparatus, system, method, and computer program product for implementing an automatic identification system with a personal communication device to improve the functionality of the device. Like reference numbers and designations in these figures refer to like elements.

FIG. 9 is a flow chart illustrating a method using the RFID business card in accordance with an embodiment of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
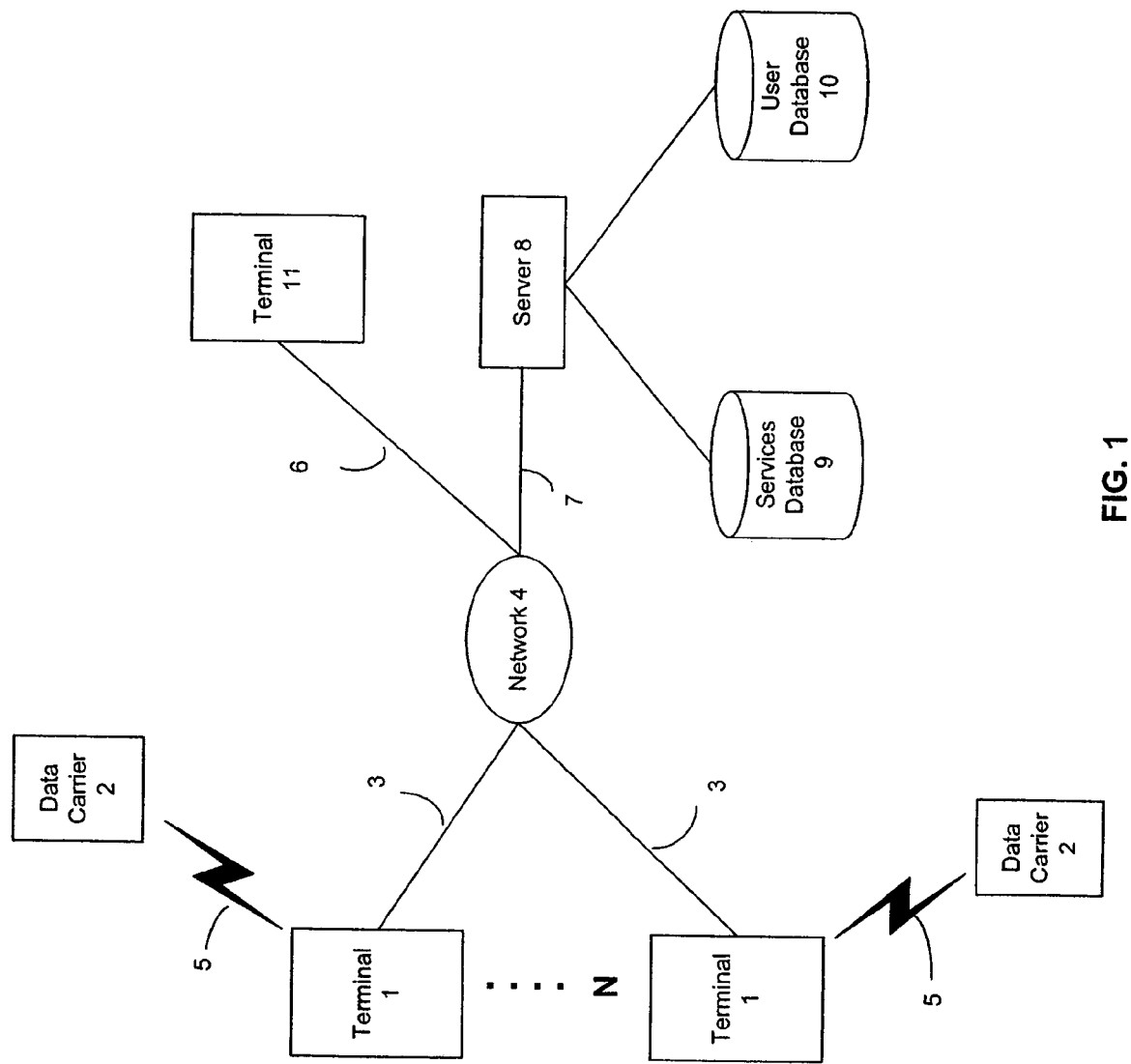
FIG. 1 is a system diagram for implementing RFID data communication in accordance with an embodiment of the invention

FIG. 1 illustrates a system diagram in accordance with an embodiment of the present invention. In FIG. 1, a plurality of terminals 1 provided with RFID readers are communicating wirelessly with their respective data carriers 2. The terminals 1 may be cellular telephones, satellite telephone, personal digital assistants, bluetooth devices, personal computers or the like. The data carrier 2 is capable of storing textual data, machine-readable data or graphical data that may be retrievable by the user via the terminal 1. It is contemplated by the invention that the machine-readable data includes, but is not limited to, barcode or OCR; and the graphical data includes, but is not limited to, drawings, images or photos. The data stored on the data carrier 2 is transferred to and received from the terminal 1 via a radio frequency (RF) communication link 5 established between a terminal 1 and a respective data carrier 2. The communication of the data between the terminal 1 and the data carrier 2 is accomplished by the implementation of a radio frequency identification (RFID) system. It is contemplated by the invention that the data carrier 2 includes the use of RFID transponder or tags (not shown) that are associated with the data stored on the data carrier 2, which emit wirelessly a signal 5 to an interrogator or tag reader (not shown) located in the terminal 1. The tags can be activated by a wireless signal received from the interrogator (passive) or can include a power supply (active) that activates the signal sent to the personal communication device 1. The signal 5 transmitted from an RFID tag is received by the RFID reader in the terminal 1 when the RFID tags on the data carrier 2 are interrogated. The transmitting range of the tags can vary between substantially zero to hundreds of feet, and may vary in transmitting range between tags.

The data received by the terminals 1 can be then transmitted via a network link 3 to a network 4. The network 4 can be the Internet, an Intranet, a mobile phone network, a PSTN, a PBX or the like. Thus, the network link 3 can be any suitable connection to the above networks such as for example a standard modem or a connection that conforms to the principle of Bluetooth standard protocol or other wireless LAN standard protocols such as, but in no way limited to, shared wireless access protocol (SWAP), Wireless Personal Area Network (WPAN) protocol, High Performance Radio Local Area Network (HIPERLAN) protocol, or Multimedia Mobile Access Communication (MMAC) protocol. The network connection 3 may also be any ordinary mobile telephone connection such as e.g., GSM, WAP EDGE, UMTS, or any similar connection. From the network 4, the data can either be sent to a server 8 for storage in a database 9, 10 via a network connection 7 or transmitted to another terminal 11 in communication with the network 4 via another network connection 6. Similar to the network connection 3, the network connection 6 can be a standard modem or a connection that conforms to the principle of standard wireless LAN standard protocols, any ordinary mobile telephone connection, or other similar connection. The data stored in the database 9, 10 is accessible by any authorized third party (not shown) having access to the database 9, 10.

Figure 2:
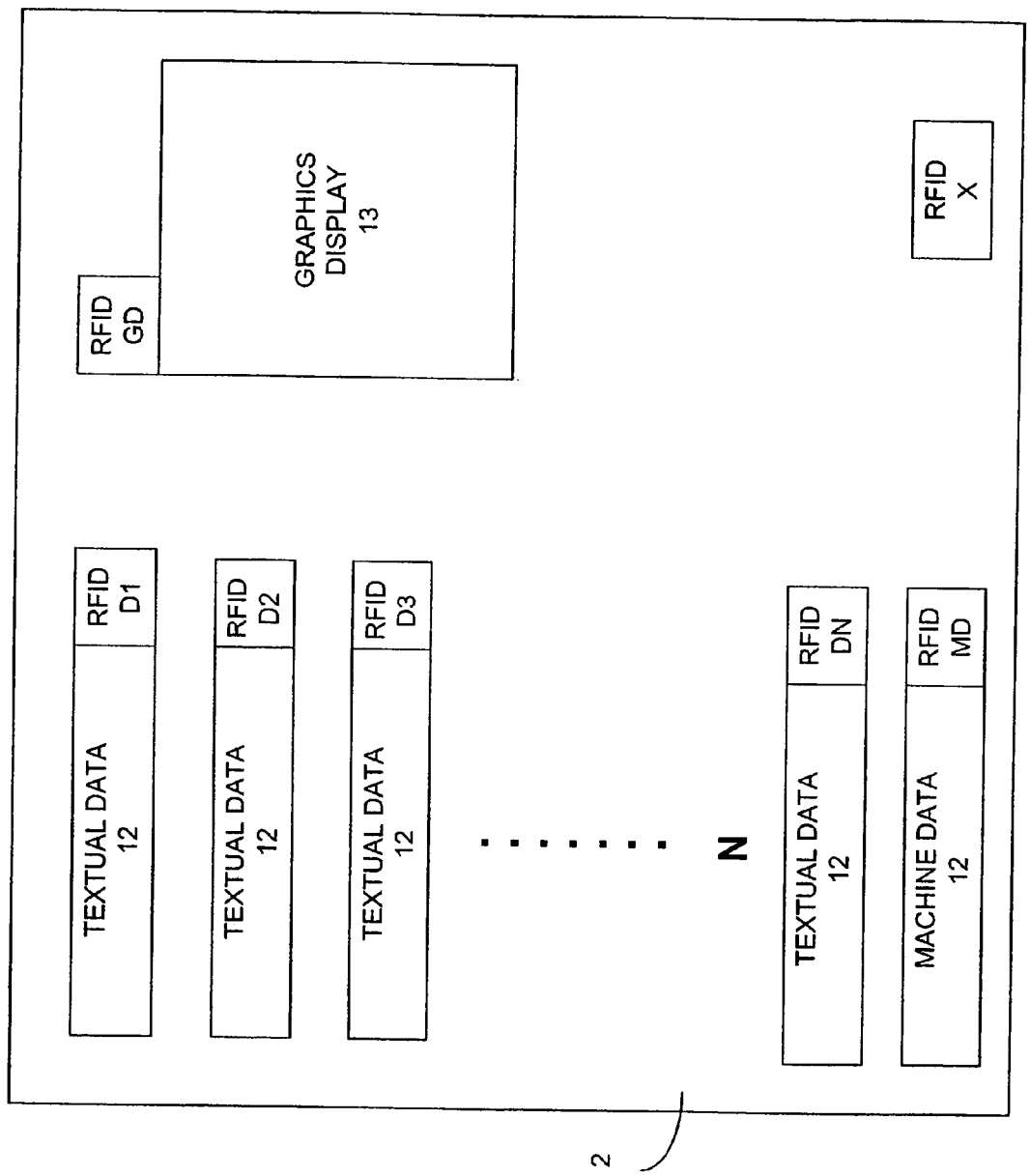
FIG. 2 is more detailed diagram illustrating a data carrier in accordance with an embodiment of the present invention.

FIG. 2 illustrates a more detailed diagram of the data carrier 2 in accordance with an embodiment of the invention. In FIG. 2, the data carrier 2 includes a plurality of data fields 12, 13 containing different data items (i.e., textual data, machine-readable data and graphical data) that is at least partly retrievable by a user possessing a respective terminal (not shown) for later use. Each of the data fields 12, 13 includes a corresponding RFID tag D1, D2, D3-DN, MD, GD, X that contain at least some data related to a data field. For example, RFID D1 contains data relating to the textual data in the corresponding first data field 12 and RFID D2 contains data relating to the textual data in the corresponding second data field and so on. However, RFID X contains identification data related to the carrier itself. Thus, the RFID tags contain memory that is read-only (ROM), random access (RAM) or non-volatile programmable depending on the sophistication of the RFID tags.

When the RFID tags D1, D2, D3-DN, MD, GD, X on the data carrier 2 are within the interrogating range of the RFID tag reader in the terminal (not shown), each RFID tag D1, D2, D3-DN, MD, GD, X will transmit a data signal to the terminal 1 containing at least some data related to the corresponding data item stored on the data carrier 2, when interrogated. The data items include textual data, machine data or graphical data. Additionally, the RFID tags D1, D2, D3, DN, MD, GD, X can also include an optional power supply (not shown) depending on whether the RFID tags D1, D2, D3-DN, MN, GD, X are active or passive.

Figure 3:
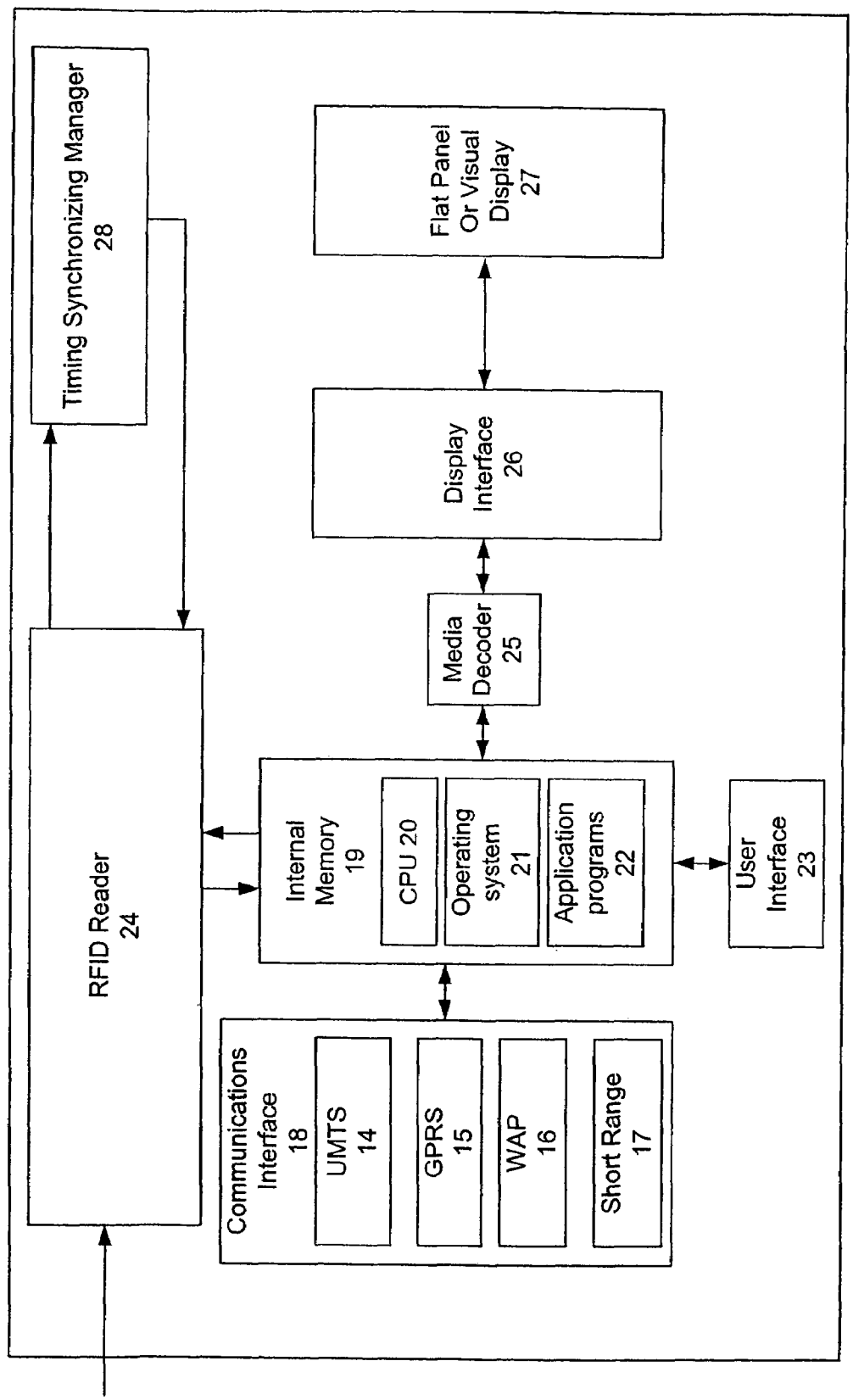
FIG. 3 is a more detailed diagram illustrating a personal communication device in accordance with an embodiment of the present invention.

FIG. 3 illustrates the internal components of a terminal 1 in accordance with an embodiment of the present invention. The terminal 1 includes several internal components essential to its operation including a tag reader 24, timing synchronizing manager 28, communication interface 18, an internal memory 19, media decoder 25, display interface 26, display 27 and user interface 23. The tag reader 24 includes an antenna and decoder (not shown). The antenna enables wireless signals to be transmitted to and received from the terminal 1. The decoder processes the signal received from the RFID tags (not shown) and forwards the information to the internal memory 19. The internal memory 19 comprises a central processor 20, operating system 21 and application programs 22. The central processor 20 executes instructions for the reception, transmission, storage and display of data, and the operating system 21 enables the execution of the application programs 22 for the display of relevant data stored in the internal memory 19 on the display 27. The user is able to interact with the terminal 1 and utilize the data via the user interface 23 and display interface 26. The user interface 23 and display interface 26 can be a keyboard, keypad, touch screen or similar user interface for communication between the user and the terminal 1. Communication interface 18 allows for the transmission and reception of data to and from the terminal 1 using various wireless communication protocols such as, but not limited to, GSM, UMTS, GPRS, WAP and short range. The communication of data using these protocols can be used to complete communication with another terminal 11 or network 4. Finally, the timing synchronization manager 28 controls the flow of data being sent and received by the terminal 1.

Figure 4:
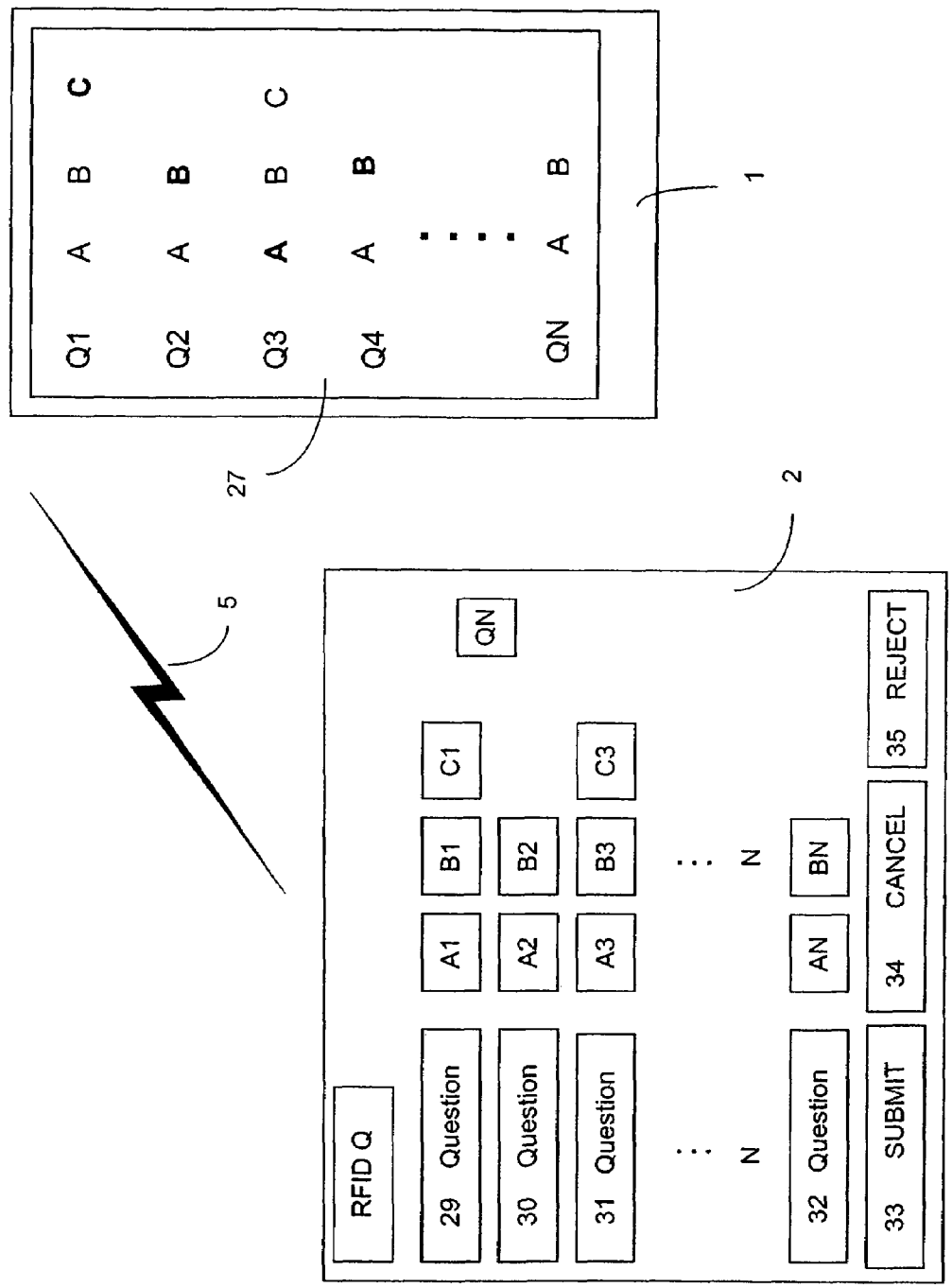
FIG. 4 is the RFID questionnaire in accordance with an embodiment of the present invention.

FIG. 4 is an RFID questionnaire in accordance with an embodiment of the present invention. By way of example, this embodiment will be applied to the clinical trial of drugs. Generally, prior to making drugs available for consumers, a series of clinical trials need to be run to verify drugs effects on the general population. In such clinical trials, persons taking the drug need to report when they took the drug and then answer a series of questions related to how they feel as a result of taking the drug. Thus, it is contemplated by the invention that, instead of a paper questionnaire, participants will receive an RFID data carrier 2 or tablet and a terminal 1 containing an RFID reader (not shown) that has integrated communication capability with the RFID data carrier 2, as discussed previously. The data carrier 2 or tablet will have a series of questions 29, 30, 31, 32 that are to be answered by the participant by selecting a series of answer buttons A1, B1, C1, A2, A3, C3, AN, BN associated with each question 29, 30, 31, 32. More specifically, each answer button A1, B1, C1, A2, A3, C3, AN, BN includes an RFID transponder or tag (not shown) that transmits a signal containing data related to the question and answer selected. Additionally, each data carrier 2 includes at least one RFID tag Q that provides identification information related to the type of data carrier 2 or questionnaire being used in the clinical trial. For example, the drug being tested, the number of questions 29, 30, 31, 32, and the number of corresponding answers A1, B1, C1, A2, A3, C3, AN, BN on the questionnaire 2. When this data is sent to the terminal 1, the CPU, operating system and application programs stored in the terminal 1 will create on a display 27 of the terminal 1 the questionnaire 2 in a compressed format. Preferably, only the number of the questions Q1-QN and the answers A-C are displayed. As an alternative, the answers may be shown as, for example, graphical symbols such as e.g., small squares or boxes. As seen in the display 27 of the terminal 1 of FIG. 4, only the question numbers Q1-QN are shown along with the answer choices A-C for each one. The highlighted answers C, B, A, B for each question in the display 27 indicate to the participant, which answers were selected for each question Q1-QN. As an alternative, a small box can be used to represent each answer choice with an "X" placed in the box to indicate the chosen answer for a particular question. If a participant wishes to change a selection, he or she simply selects another answer A-C to the question 29, 30, 31, 32 whereby the earlier answer A-C is replaced by the latter selection. In another embodiment, only the selected answers A-C are shown. Once the participant is satisfied with all the answers A-C, the answers A-C can be submitted by activating the submit button 33 on the data carrier 2. If a participant tries to submit an incomplete questionnaire 2, the participant with receives an indication of the incomplete status. For example, the text or graphics of any unanswered question will blink to indicate that the unanswered questions must be answered prior to submission. This feature may also be used to indicate unanswered questions at any time during the answering process, and prior to activating the submit button 33. If a participant is unhappy with the answers selected, he or she can activate the cancel button 34 on the data carrier 2. However, if the answers have already been submitted, he or she can activate the reject button 35 to delete all answers and start again. Specifically, by activating the reject button 35 within a predetermined time period, e.g. 30 seconds, of sending the answers, a signal will be sent to the terminal 1 to delete the previous answers submitted. However, once the participant is happy with the answers, the answers can be submitted and stored in the terminal for transmission to a third party such as drug company or government agencies. As an alternative, an RFID tag could contain information related to a desired destination or address for sending the submitted answers to a questionnaire 2. Thus, when the data is submitted, the answers to the questionnaire will automatically be sent to the desired destination e.g. by using one or more SMS messages. Using this embodiment of the present invention, a third party can receive real-time data that is critical to drug performance. It is contemplated by the invention that the questionnaire application is not limited to clinical trials with drugs and can be used in any application where it would be useful to receive real-time data related to a questionnaire or survey.

Figure 5:
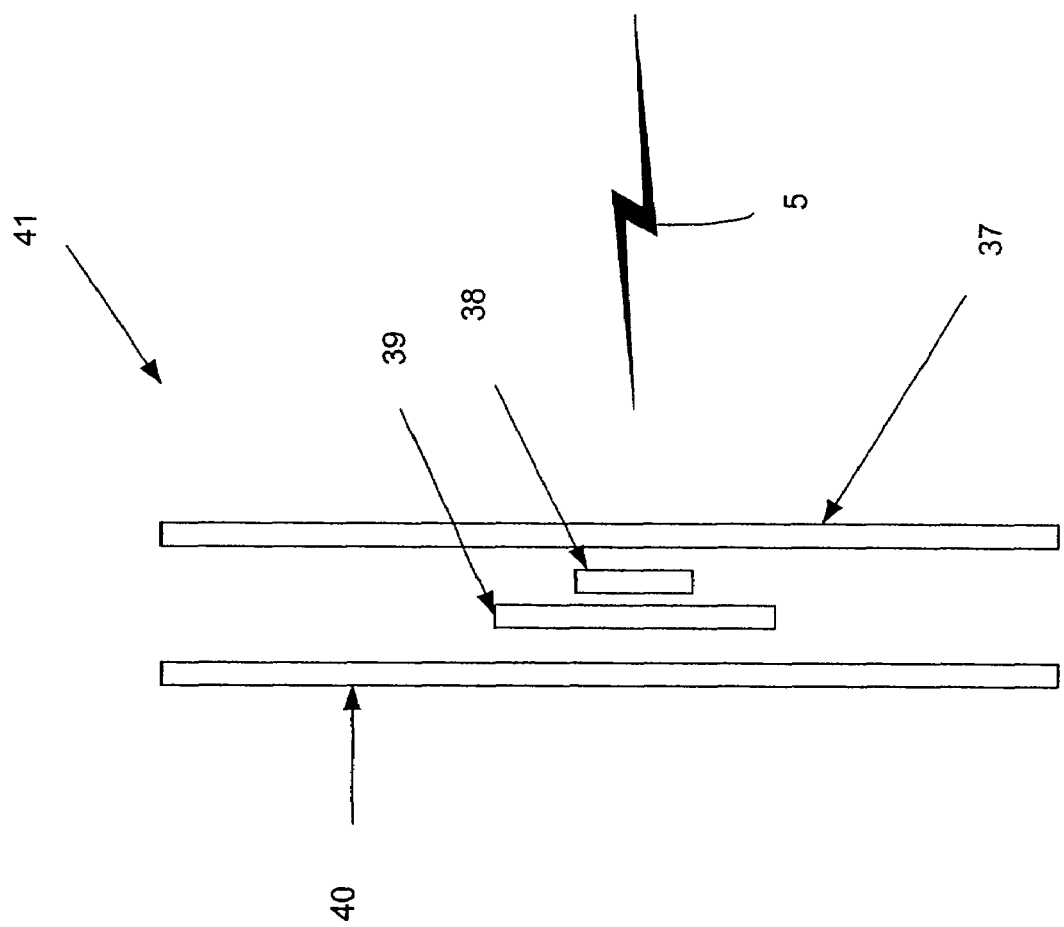
FIG. 5 is a detailed diagram of an exemplary button used for the RFID questionnaire in accordance with an embodiment of the present invention.
Figure 6:
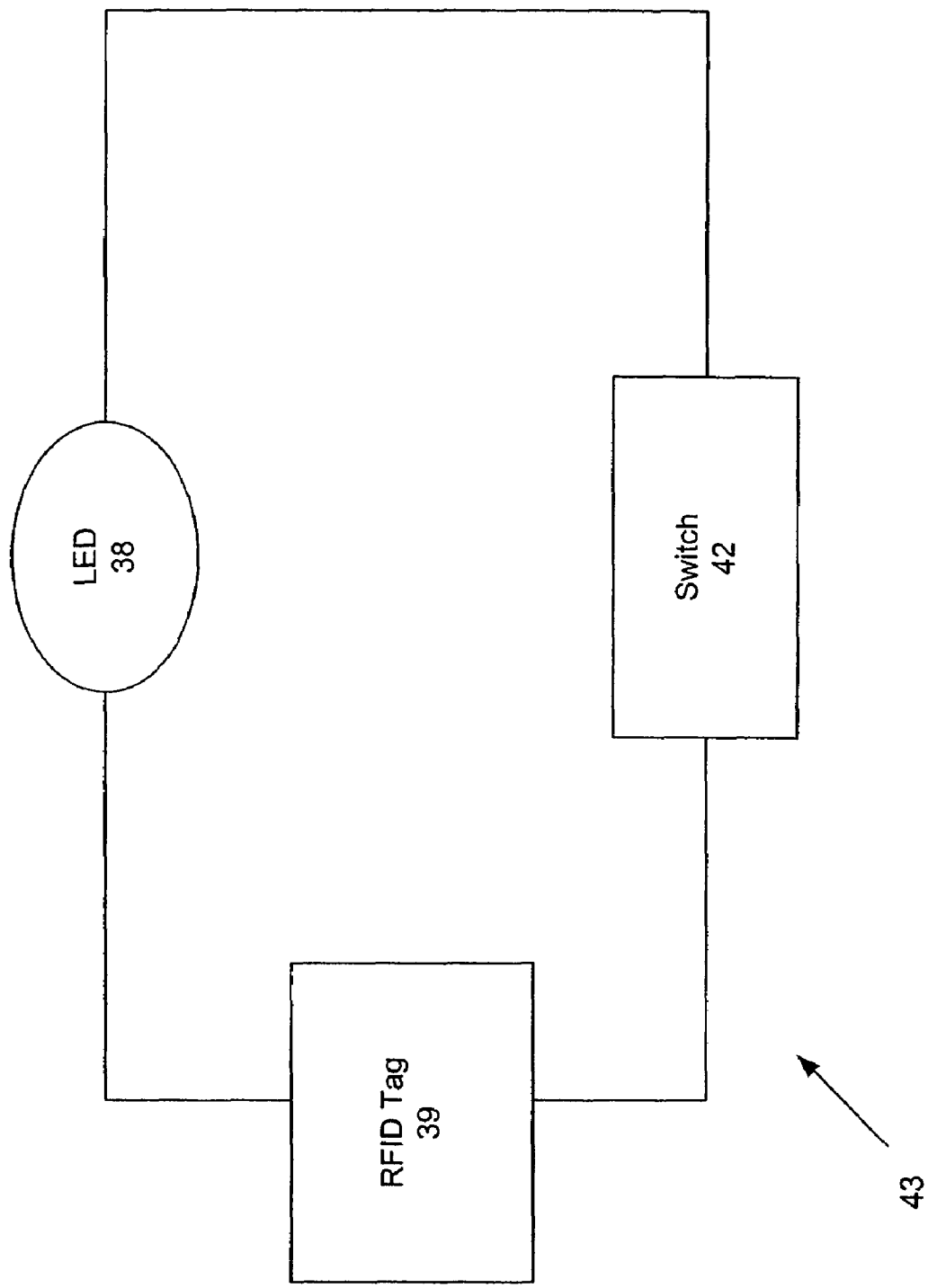
FIG. 6 is a basic circuit diagram illustrating the electrical connection of a button used for the RFID questionnaire in accordance with an embodiment of the present invention.

FIG. 5 is a detailed diagram of the exemplary structure of a button 41 used for the RFID questionnaire 2 in accordance with an embodiment of the present invention. The basic component of each RFID button 41 on the questionnaire 2 includes a cover 37, LED 38, RFID tag 39 and base 40. The cover 37 is transparent and protects the internal components of each RFID button 41. The cover 37 is made from a pliable material such as plastic so that when a participant presses the button 41 the pressure exerted on the cover can be transmitted to the electrical components underneath the cover 37. The button 41 may include the use of a switch or contact that is normally open when the button 41 is in a resting state. However, when the cover 37 of the button 41 is pushed the switch or contact makes an electrical connection to complete the RFID button circuit (not shown). A simplified diagram of the button circuit is illustrated in FIG. 6. Once the RFID button is pushed, the electrical circuit is energized the RFID so that the RFID tag 39 can send a data signal 5 to the terminal 1 (not shown). The LED 38 is also energized and indicates to the user that the button has been pushed. The base 40 is used to provide a rigid surface for mounting the electrical components of the RFID button 41.

FIG. 6 is a basic circuit diagram illustrating the electrical connection of a button 41 used for the RFID questionnaire 2 in accordance with an embodiment of the present invention. As shown in FIG. 6, there are three critical components that make-up the RFID button circuit 43 that includes the RFID tag 39, the LED 38 and a simple switch 42. The switch 42 is normally open so that neither the RFID tag 39 nor the LED 38 is initially energized. However, as mentioned previously, pressing the cover 37 of the RFID button closes the switch 42 and completes the RFID button circuit 43. Once the electrical circuit 43 is complete, the RFID tag 39 transmits a signal to the RFID tag reader 24 in the terminal 1.

Figure 7:
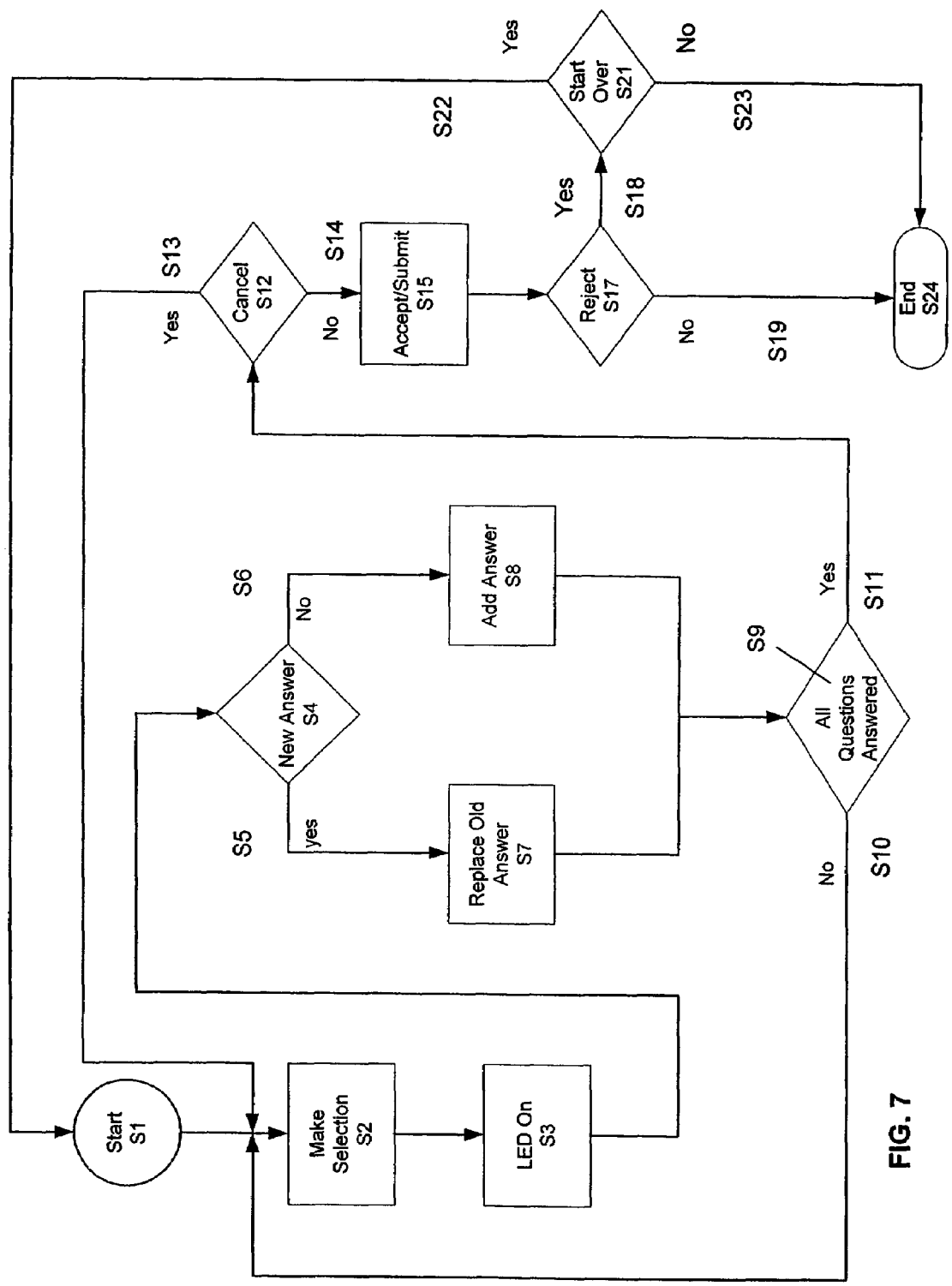
FIG. 7 is a flow chart illustrating a method of using the RFID questionnaire in accordance with an embodiment of the present invention.

FIG. 7 is a flow chart illustrating a method of using the RFID questionnaire 2 in accordance with an embodiment of the present invention. In step S1, the participants receive a questionnaire 2 that is an RFID data carrier 2 or tablet along with a terminal 1 containing an RFID reader 24 that has integrated communication capability with the questionnaire 2. As mentioned previously, each questionnaire 2 will have a series of questions 29-32 that are to be answered by the participant. Each question has a series of answers A1-BN associated with it that can be individual selected by the participant. In step S2, the participant selects a desired answer by pushing a respective answer button A1-BN on the questionnaire 2. In step S3, as each answer A1-BN is pushed, a respective LED 38 is lit to indicate that an answer has been selected for a particular question. In step S4, the participant can decide whether the selected answer is satisfactory. If the answer is not satisfactory, the participant may replace the answer in step S7 by simply selecting another answer choice for that question. Once a new answer is selected, the LED 38 corresponding to the old answer is extinguished at the same time the LED corresponding to the new answer is lit. On the other hand, if a participant is unhappy with all answer choices listed, in step S8 a new answer choice can be requested or added to the questionnaire 2. In step S9, the participant can decide to continue to answer the remaining questions on the questionnaire S10 or decide to select other options. For example, in step S11, if all the questions 29-32 are answered, the participant has the options of canceling all the answers S12 by pushing the cancel button 32 the questionnaire 2 and starting over S13, or not canceling the answer choices S14 and accepting and submitting the answers by selecting the submit 33 or accept button S15. In step S17, the participant may decide after sending the answers that he or she is unhappy with the answer choices submitted S18. Therefore, the participant may send a reject request S20 to the terminal 1 by selecting the reject button on the questionnaire within 30 seconds after sending the answers. In step S21, the participant has the option of beginning the process again S22 or discontinuing the process S23 by terminating the answering session S24. On the other hand, if the participant is satisfied with the answers submitted, the process is terminated S24.

Figure 8:
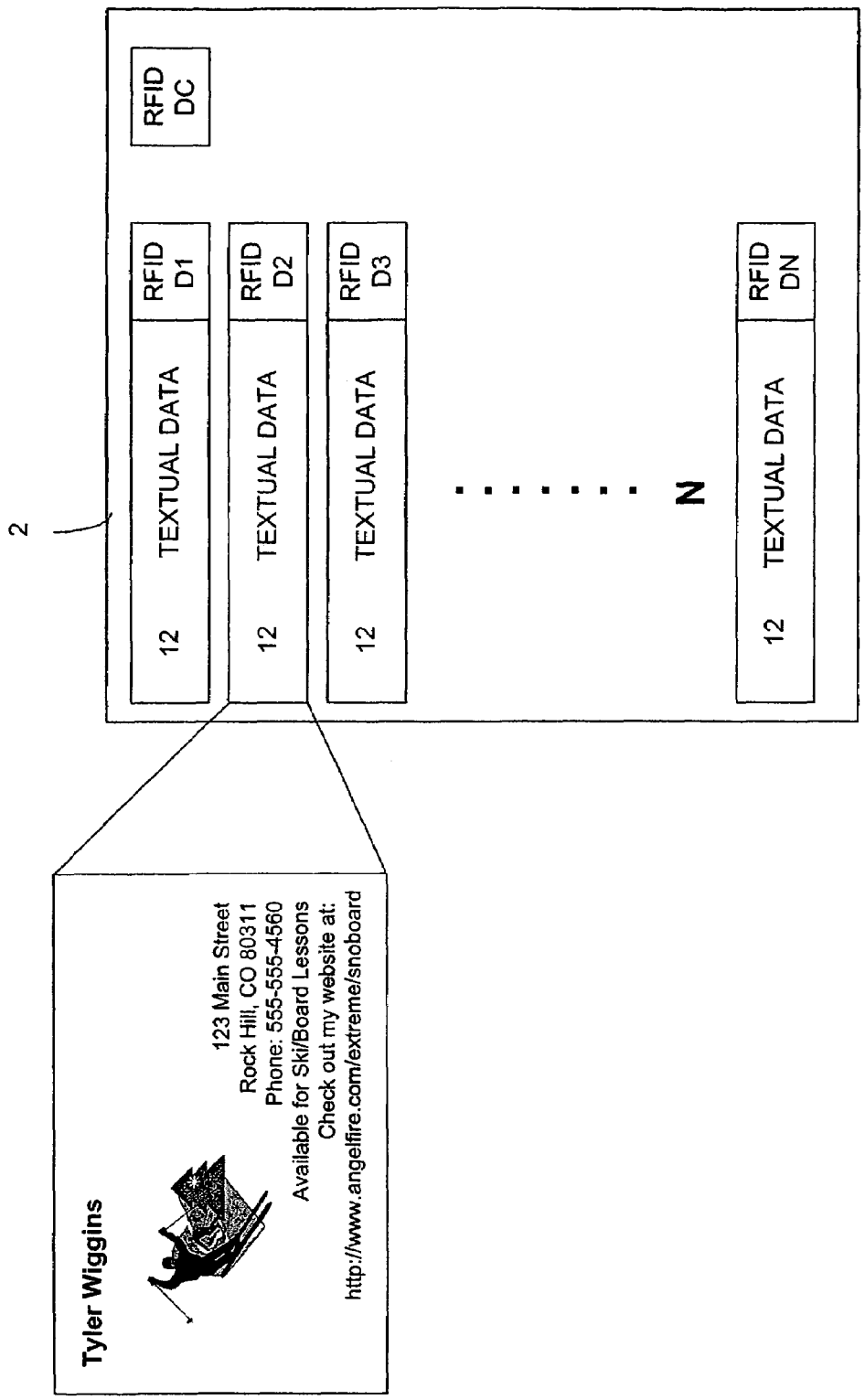
FIG. 8 is a detailed diagram illustrating an RFID business card in accordance with an embodiment of the present invention.

FIG. 8 is a detailed diagram illustrating an RFID business card in accordance with an embodiment of the present invention. In accordance with the business card application of the present invention, the user of a terminal 1 receives a data carrier 2, such as a business card containing third party information. The business card application includes three main components: 1) an RFID chip embedded data carrier or business card 2 that stores information that may be normally found on a printed business card; 2) a terminal 1 that is, for example but not limited to, a wireless mobile terminal with an RFID reader (not shown), which has connection capability to the terminal operating system; and 3) software in the terminal for communication between the RFID reader and other applications in the terminal such as voice calling, SMS, WAP browser, web browser, address book, e-mail, calender and map applications. It is contemplated by the invention, that the user of the terminal 1 receives the data carrier 2 containing third party information. The user is able to receive the data from the business card 2 because of the implementation of the RFID system i.e., RFID tag(s) and RFID reader. As seen in FIG. 8, the data carrier 2 contains a plurality of data fields 12. At least one data field 12, contains information related the third party such as name data, address data, phone number data, company data. As mentioned previously, the personal data on the business card 2 is similar to the personal data found on a printed business card. Additionally, each data field 12 has a corresponding RFID tag D1-DN. The data content of the RFID tags relate to the personal data in the data fields. At least one of the RFID tags DC includes identification information related to the data carrier 2. The data retrieved from the data carrier 2 is stored in a memory location of the terminal 1 and may be used for setting up communications between the user of the terminal 1 and a third party. For example, the retrieved data could be a phone number or website address of the third party identified by the data carrier 2. It is contemplated by the invention that the third party identified on the data carrier 2 could also be the owner of the data carrier 2. The RFID reader software, operating system and application programs in the terminal 1 use the retrieved data to display options to the user related to the third party data identified by the data carrier 2. For example, "would you like to call the third party?"; "would you like to connect to the third party website?"; or "would you like to send an e-mail to the third party?" Once the user makes a selection, the terminal 1 will establish a communication connection to another device using at least part of the data received from the data carrier such as a phone number, URL or WAP or the like.

FIG. 9 is a flow chart illustrating a method of using the RFID business card 2 in accordance with an embodiment of the present invention. In step S32, the user of the terminal 1 receives a data carrier 2 or electronic business card. In step S33, the RFID reader in the terminal scans the data carrier 2 for a data signals from the RFID tags. The data signal from the RFID tags on data carrier 2 are decoded and processed by the terminal 1. In step S34, the terminal 1 then uses the data to display options available to the user related to the third party data received by the data carrier. For example, the terminal 1 would display options such as "Do you want to call the third party?" S35; "Do you want to send an e-mail to the third party?" S38; or Do you want to visit the third party's website?" 41. This is a list of just some of the options that could be displayed to the user of the terminal 1 and is in on way intended to an exhaustive list. The user simply scrolls down the list of options using a user-interface and selects the option of his/her choice. The user may also choose more than one option during a single communication session. For example, if the user initially selects the option to call the third party S36 and completes the call S44, in step S47 the user will be asked if another option is desired. If another option is desired S48, the terminal 1 will again display the original options S34 for selection by the user. In fact, each time the user makes a selection S36, S39, S42 the terminal 1 will give the user the chance to view the original list of options available S47. In step 50, the process will end once the user indicates that no other options are desired S37, S40, S43.

Presently, there is no existing technology that would be suitable for implementing an automatic identification system with a personal communication device to improve device functionality, as contemplated by the present invention. The advantage of the present invention as described herein is that it provides a more efficient use of a personal communication device by automatically communicating more relevant data to a user, or triggering a service or an application.

Although illustrative embodiments have been described herein in detail, its should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A data carrier, comprising:
   a data carrier having a plurality of RFID transponders, each of said RFID transponders being associated with a respective one of a corresponding plurality of different data fields, each data field containing distinctive contact information related to user selectable options for contacting a third party identified by the data carrier;
   an additional RFID transponder on said data carrier associated with an additional data field containing information identifying said data carrier and the number of said plurality of different data fields;
   wherein the data content of said plurality of RFID transponders is at least partly retrievable by a user for later use.

2. The data carrier of claim 1, wherein at least one of said plurality of data fields contains machine-readable data or textual data, and the remaining said plurality minus one data fields contain said distinctive contact information.

3. The data carrier of claim 1, wherein at least one of said plurality of data fields contains graphical data.

4. The data carrier of claim 3, wherein said graphical data is a drawing, an image or a photograph.

5. The data carrier of claim 1, where at least one of said plurality of RFID transponders is a passive or active transponder.

6. The data carrier of claim 1, wherein data content of at least one of said plurality of RFID transponders related to said distinctive contact information in at least one of said plurality of data fields is communicated by a signal from an RFID transponder to an RFID reader proximate to said data carrier.

7. The data carrier of claim 1, wherein the data content of at least one of said plurality of RFID transponders is associated with an identification of said data carrier.

8. The data carrier of claim 1, wherein the data content of at least one of said plurality of RFID transponders is associated with graphical data stored on the data carrier.

9. The data carrier of claim 1, wherein each of said data fields is associated with at least one RFID transponder.

10. The data carrier of claim 1, wherein the data carrier is a business card with at least one of said plurality of data fields comprising:
    name data;
    address data;
    phone number data; and
    business data;
    wherein the data content of a corresponding one of said plurality of RFID transponders is related to the data content of at least one of said plurality of data fields.

11. The data carrier of claim 1, wherein the data content of at least one of said plurality of RFID transponders includes data for initializing a communication connection.

12. The data carrier of claim 11, wherein the communication connection is a mobile phone network connection or computer network connection.

13. The carrier of claim 1, wherein said data carrier is a questionnaire, comprising:
 a plurality of data fields containing at least one question having a corresponding selectable answer; and
 a plurality of RFID transponders associated with each said selectable answer corresponding to said question.

14. The data carrier of claim 13, further comprising at least one RFID transponder including data for setting up a communication connection for sending a response to said questionnaire.

15. The data carrier of claim 1, wherein said data carrier is a questionnaire, comprising:
 a plurality of data fields containing at least one proposal having a corresponding selectable opinion; and
 a plurality of RFID transponder associated with each said selectable opinion corresponding to said proposal.

16. The data carrier of claim 15, further comprising at least one RFID transponder including data for setting up a communication connection for sending a response to said questionnaire.

17. The data carrier of claim 1, wherein the data content of at least one of said plurality of RFID transponders includes data for triggering a request for a service or a request for data storage in a computer network.

* * * * *